L. E. BUSHBY.
VEHICLE.
APPLICATION FILED MAR. 25, 1913.
1,073,330.
Patented Sept. 16, 1913.
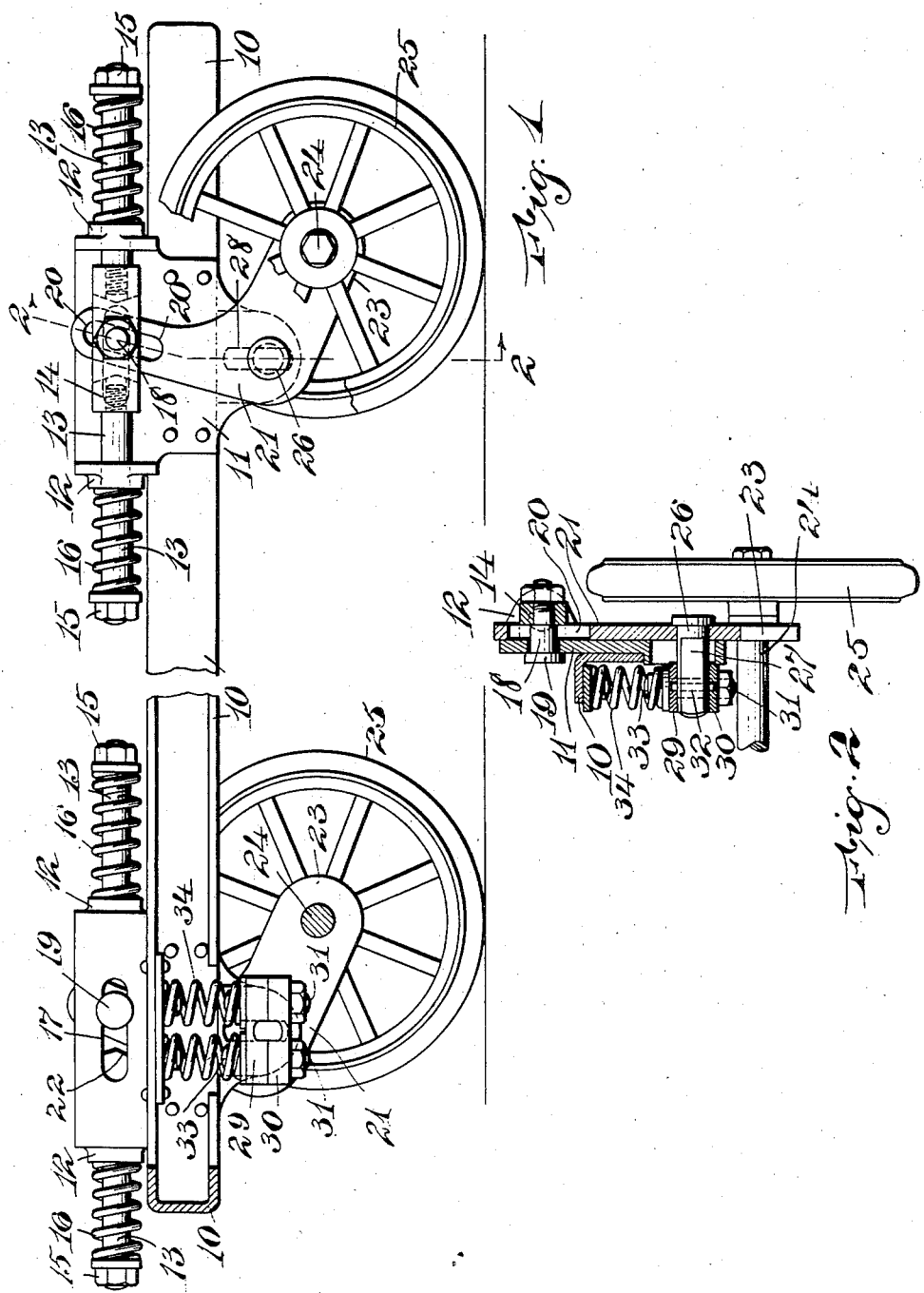
WITNESSES:
M. A. Johnson.
W. E. Morton.
INVENTOR
Ludger E. Bushby,
BY
Wm H. Campbell.
ATTORNEYS

UNITED STATES PATENT OFFICE.

LUDGER E. BUSHBY, OF NEWARK, NEW JERSEY.

VEHICLE.

1,073,330.

Specification of Letters Patent.  Patented Sept. 16, 1913.

Application filed March 25, 1913. Serial No. 756,670.

*To all whom it may concern:*

Be it known that I, LUDGER E. BUSHBY, a citizen of the United States, residing at Newark, in the county of Essex and State of New Jersey, have invented certain new and useful Improvements in Vehicles; and I do hereby declare the following to be a full, clear, and exact description of the invention, such as will enable others skilled in the art to which it appertains to make and use the same, reference being had to the accompanying drawing, and to figures of reference marked thereon, which forms a part of this specification.

This invention relates to an improved vehicle in which shock is absorbed, and I have devised a mechanism in which the vertical movement of the axle is yieldingly resisted on the frame, both when the frame and axle move toward each other and when the frame and axle move away from each other; and I also provide a means for making the attachment between the frame and the axle more flexible by giving each individual wheel, or rather its end of the axis, a limited movement without affecting the other end of the axle or the other wheel on the same end of the frame. Shock absorbing devices of this type have been employed, but my invention relates to the flexible attachment of each end of the axle to the body of the vehicle or the frame.

In prior devices when the axle moves up on one end it has a tendency to carry with it the other end of the axle, since they have been rather rigidly connected, and the shock absorbing devices have in some instances been connected by transverse connections.

In my invention each end of each axle is supported in a way that permits that end of the axle and the frame to have a relative movement without affecting the other end of the axle or the other axle.

The invention is illustrated in the accompanying drawing, in which—

Figure 1 is a view showing, on the left hand end of it, the frame in section and showing the inside mounting of the shock absorbing feature, the right hand end of the figure showing an exterior view. Fig. 2 is a section through line 2, 2, in Fig. 1.

I show a frame 10 which is drawn to illustrate the chassis of an automobile, being formed, as they usually are, of a U-shaped beam on the outside, and to the chassis I affix a suitable number of plates 11, the plates being attached to the frame fixedly and having bearings 12, these bearings being separated. Sliding in the bearings are the rods 13 which practically form one rod, since they are connected by a block 14, the rods 13 projecting beyond the bearings 12 and having suitable adjusting means, such as the nuts 15, which can be provided with a suitable locking means. The nuts 15 are screwed onto the end of the rods 13 and can thereby adjust the tension of the springs 16, the springs abutting against the adjusting means and against the bearings so that the springs yieldingly resist a movement of the rod in either direction.

Each plate 11 extends above the frame and is provided with a slot 17 through which passes a pin 18 with its head 19 on the back of the plate and its front passing through the slot 20 of the bell-crank 21. The block 14 is cut away as at 22 to receive the bell-crank 21, the pin 18 being secured to the block 14 whereby the block, and consequently its rod, and the bell-crank move together. The bell-crank 21 is provided at its lower end with a suitable bearing 23 for the axle 24. It will be understood that each axle has on each end a shock absorbing device, each end of the axle being also provided with a wheel 25, on which wheels the vehicle is propelled. The bell-crank is pivoted on the pivotal pin 26 which is preferably flattened as at 27 so that it is held against turning in a slot 28 in the plate 11. Suitable blocks 29 and 30 embrace the pivotal pin 26 on its inner end, being held in place by the bolts 31. The blocks are further secured in place by means of a pin 32. The heads 33 of the bolts 31 form seats for the springs 34, which springs bear on the blocks and abut on the frame 10.

It will be seen from this construction that any ordinary shock or strain that comes on the frame or on the wheel is transmitted to the bell-crank. The bell-crank is pivoted on the pin 26, and if the jar is slight, that is, if it is of a minor character, the springs 34 permit the wheel and the corner of the frame that is subjected to the strain, to move toward each other without affecting the other wheels. A larger strain, however, causes a compression of one of the springs 16 against which the bell-crank pulls, through the rod 13, when the frame comes down toward the wheel. In both cases the rebound, that is, the movement of the wheel and the frame from each other, is checked by the other spring 16 which resists this movement. It will be noted that the springs 34 are not apt to be submitted to an excessive and sharp pressure. In fact none of the springs are, because if the pivot 26 rises in the slot 28, its vertical movement causes a slight swinging, usually of the bell-crank 21, and a transmission of some of the strain to the spring 16 which is compressed when the frame rides downward in its relation to the wheel. This structure makes a flexible mounting, since the slotted connection for the pin 26 permits the pin to ride upward along with the bell-crank and that end of the axle without influencing the other end of the axle.

Having thus described my invention, what I claim is:—

1. In a vehicle, a frame, axles, bell-cranks, each bell-crank having one end attached to an axle, a cushioning device engaging the bell-crank at its other end, a pivot for the bell-crank, the pivot being secured to the frame to permit the pivot having a limited vertical movement in the frame, and springs bearing on the frame and on the pivot for yieldingly resisting upward movement of the pivot.

2. In a vehicle, a frame, an axle, the frame having a vertically arranged slot, a pivotal pin in the slot, blocks on the pin, springs bearing on the frame and on the blocks for supporting the frame on the blocks, a bell-crank arranged to swing on the pivot, the lower end of the bell-crank being supported by the axle, and cushioning devices engaging the top end of the bell-crank to yieldingly resist its movement.

3. In a vehicle, a frame, an axle, the frame having a vertically arranged slot, a pivotal pin in the slot, blocks on the pin, springs bearing on the frame and on the blocks for supporting the frame on the blocks, a bell-crank arranged to swing on the pivot, the lower end of the bell-crank being supported by the axle, separated bearings on the frame, a rod sliding in the bearings and projecting beyond the bearings, adjusting means at the ends of the rods, springs bearing on the adjusting means and on the bearings, the upper end of the bell-crank being slotted, and a pin secured to the rod and projecting through the slotted end of the bell-crank.

In testimony, that I claim the foregoing, I have hereunto set my hand this 24th day of March, 1913.

LUDGER E. BUSHBY.

Witnesses:
WM. H. CAMFIELD,
M. A. JOHNSON.